(12) United States Patent
Fu

(10) Patent No.: US 8,424,572 B2
(45) Date of Patent: Apr. 23, 2013

(54) METHOD FOR CONTROLLING THE TRANSFER OF MATERIALS

(75) Inventor: Chunsheng C Fu, West Chester, OH (US)

(73) Assignee: The Procter & Gamble Company, Cincinatti, OH (US)

( * ) Notice: Subject to any disclaimer, the term of this patent is extended or adjusted under 35 U.S.C. 154(b) by 882 days.

(21) Appl. No.: 12/564,983

(22) Filed: Sep. 23, 2009

(65) Prior Publication Data

US 2011/0071660 A1  Mar. 24, 2011

(51) Int. Cl.
*B65B 1/04* (2006.01)

(52) U.S. Cl.
USPC .............. 141/9; 141/83; 141/100; 141/104; 222/57; 222/77

(58) Field of Classification Search ............ 141/1, 9, 141/83, 100, 104; 222/57, 58, 77; 177/116
See application file for complete search history.

(56) References Cited

U.S. PATENT DOCUMENTS

| | | | |
|---|---|---|---|
| 4,524,839 A | 6/1985 | Cochran, Jr. et al. | |
| 4,843,579 A * | 6/1989 | Andrews et al. | 700/305 |
| 5,340,211 A | 8/1994 | Pratt | |
| 5,368,059 A | 11/1994 | Box et al. | |
| 6,380,495 B1 | 4/2002 | Ash et al. | |
| 6,441,322 B1 | 8/2002 | Ash et al. | |
| 6,655,422 B2 * | 12/2003 | Shock | 141/83 |
| 6,811,301 B2 | 11/2004 | Packard | |
| 7,789,111 B2 * | 9/2010 | Luehrsen et al. | 141/83 |
| 7,958,916 B2 * | 6/2011 | Poole et al. | 141/83 |
| 2002/0026285 A1 | 2/2002 | Nishijima | |
| 2003/0070724 A1 * | 4/2003 | Shock | 141/83 |
| 2003/0121561 A1 | 7/2003 | Wagner et al. | |
| 2004/0165475 A1 | 8/2004 | Afnan et al. | |
| 2005/0283273 A1 * | 12/2005 | Keras et al. | 700/239 |
| 2006/0009875 A1 | 1/2006 | Simpson et al. | |
| 2007/0151623 A1 * | 7/2007 | Poole et al. | 141/83 |
| 2011/0168455 A1 * | 7/2011 | Davis et al. | 177/1 |

FOREIGN PATENT DOCUMENTS

| | | |
|---|---|---|
| JP | 10142035 | 5/1998 |
| JP | 10197321 | 7/1998 |
| WO | WO 0105698 A1 | 1/2001 |
| WO | WO 01/38835 A1 | 5/2001 |

* cited by examiner

*Primary Examiner* — Gregory Huson
*Assistant Examiner* — Nicolas A Arnett
(74) *Attorney, Agent, or Firm* — David K Mattheis; Kim W Zerby

(57) ABSTRACT

A method for controlling an amount of material transferred in a system having a plurality of material feeds and concurrent material transfer periods. The method comprising steps of: supplying each of a primary material having a target weight and a secondary material, to a receiving vessel; determining a decision threshold; feeding the primary material to the receiving vessel, feeding the secondary material into the receiving vessel as or after the primary material begins feeding and before the decision threshold, determining a feed status of the primary and secondary materials at the decision threshold; changing the feed status of one of the primary or secondary materials at the decision threshold; and feeding only the primary material within a feed alone time period until the target weight amount is fed.

20 Claims, 1 Drawing Sheet

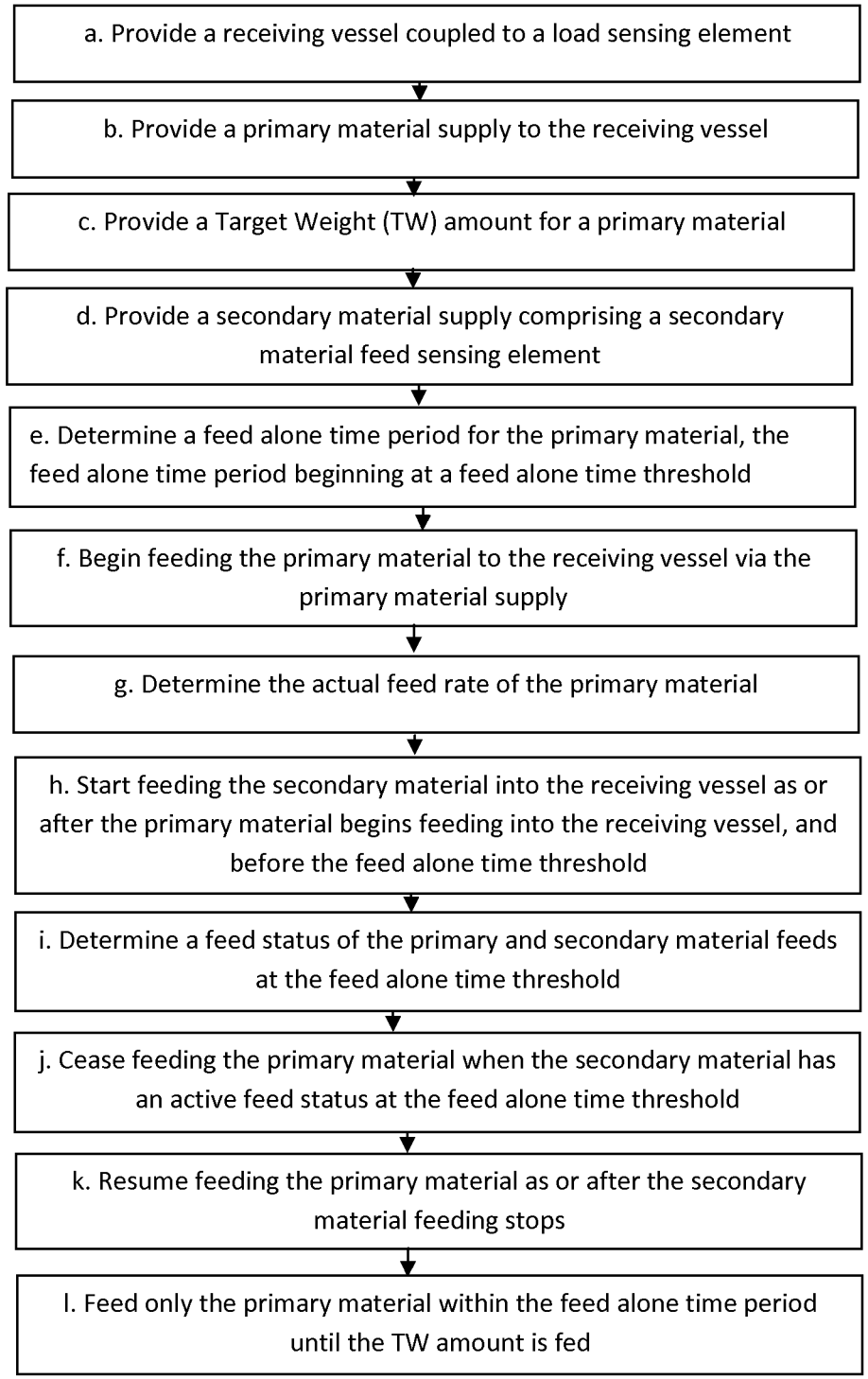

METHOD FOR CONTROLLING THE TRANSFER OF MATERIALS

FIELD OF THE INVENTION

The invention relates to methods for controlling the transfer of materials. The invention relates particularly to the concurrent transfer of multiple materials to a common destination.

BACKGROUND OF THE INVENTION

Modern manufacturing processes often require the concurrent transfer of multiple materials to a common destination such that the materials may be mixed together. The transfer of materials may be accomplished using completely manual controls. Such controls by themselves do not ensure accurate material transfer and may not represent an efficient utilization of time and personnel resources. Automated processes may be a more efficient means of achieving the material transfer. Automation is of little use unless it yields predictable and accurate results and also represents an efficient use of capital and human resources.

Protocols for the transfer of multiple materials may provide for a sequential transfer of the materials such that each material is provided in turn as part of an overall sequence. Such protocols may also provide for the concurrent transfer of multiple materials such that a savings of time for the overall transfer of materials may be achieved. Concurrently providing multiple materials introduces additional variability into the transfer process and may induce errors in the material transfer leading to waste. A method for efficiently controlling the concurrent transfer of multiple materials without introducing errors or increasing process waste is desired.

DETAILED DESCRIPTION OF THE INVENTION

The method of the invention may be practiced utilizing industrial automation equipment as is known in the art. Programmable logic controllers or other industrial computers may be used in concert with load cells, mass and volumetric flow meters as well as other known industrial sensors to implement the control method. The method may be provided as instructions via any digital storage media such as removable flash drives, floppy disks, hard drive or other electronic storage media. The method may be executed as the logic in a control computer system. The method of the invention may be applied to a system for the transfer and use of materials wherein materials are supplied to a common destination. The common destination, or vessel, may comprise a mixing tank or a holding tank as these elements are known in the art. The common destination could also comprise a reactor tank in which the combined materials are further processed. The vessel comprises or is otherwise coupled to a sensor element which provides an output indicative of the quantity of material present in and supplied to the vessel. The sensor element may comprise a load cell adapted to indicate the combined weight of the vessel and its contents, or a level sensor adapted to indicate the level of material in the vessel. The combination of the vessel and the sensor provides a means of determining how much material has been added to the vessel. A tare reading may be taken to determine the amount of material in the vessel prior to adding any materials to the vessel. As material is added to the vessel, the sensor reading provides an ongoing indication of the amount of added material.

A first material may be supplied to the vessel relying upon the sensor element to provide an indication of the amount of material added. The sensor totals up the added material and the total output may be used in conjunction with the tare reading to determine how much total material has been added.

Secondary, tertiary, quaternary and other materials may be added to the vessel in addition to the first or primary material. Each material supply other than the first material supply includes a means of indicating the quantity of the material provided to the vessel beyond the sensor element of the vessel. This means may comprise a load cell configured to provide an indication of the reduction in the load in a pre-weight vessel as a secondary material is transferred to the vessel. The means may comprise a mass or volumetric flow meter configured to indicate the amount of a secondary material transferred to the vessel. The indicating means may comprise a level sensor configured to output a change in level as a secondary material is transferred to the vessel. In each of these arrangements, the sensor means provides an indication of the secondary material transferred which is independent of the sensor element of the vessel.

According to the method of the invention, the first or primary material is provided to the common vessel. A target weight (TW) for the primary material is designated. The TW may be provided in any units recognizable by a control system used to monitor and control the material transfer process. A flow rate for the primary material may also be provided to the control system. Alternatively, or in addition to the provided flow rate, the control system may calculate a flow rate for the primary material and may maintain an updated value for the flow rate based upon actual material flows of the primary material.

A feed alone time period for the primary material is established. The feed alone time period may be set at an amount of time determined via experience with the primary material feeds to allow for the material to begin feeding, reach a stable feed rate and finish feeding the primary material. In one embodiment the feed alone time may be established as ten seconds. For a material feed system which reaches a stable feeding rate more rapidly, the feed alone time may be set at less time for example 5 seconds. For material feed systems requiring more time to reach a stable feed rate after feeding is initiated, 15, 20, 30 seconds or more may be established as the feed alone time period.

The feed alone time period may be used to establish a decision threshold. Control logic may be provided to specify actions to be taken under different system scenarios when the decision threshold is reached. The control logic may include determining which if any material supplies are feeding materials to the vessel, how much material remains to be fed of each of the respective materials, which material feeds to hold, or cease feeding, and which materials feeds to continue. As materials are transferred, the control system, or logic of the control system, may monitor the transfer and may determine that the decision threshold has been reached in a number of different ways. In one embodiment, the system may use a flow rate, the target weight, and the feed alone time for the primary material to determine a length of time prior to the decision threshold. Dividing the target weight by the flow rate provides a time for the transfer of all of the target weight. The feed alone time may be subtracted from this total time to determine the time from the start of the primary material feed until the decision threshold. The actual flow rate of the primary material may be used during the feeding of the primary material to update the total required time and the time until the decision threshold. Alternatively, the calculation could compare the amount of time remaining until the target weight is fed and the feed alone time. As the calculated amount of time expires, or the comparison determines that the feed alone time is all that remains, the logic associated with the decision threshold may be executed.

In one embodiment the control system, or control system logic may calculate the material equivalent of the feed alone time. The historical or actual flow rate of the primary material and the feed alone time may be used to determine the amount of the primary material which would be fed during the feed alone time. The calculated amount may be subtracted from the target weight of the primary material to determine a weight to be fed prior to the decision threshold. The system may then monitor the amount of the primary material fed and compare the amount to the calculated amount to be fed prior to the decision threshold. When the amount fed equals the amount prior to the decision threshold, the logic associated with the decision threshold may be executed. Alternatively, the system may monitor the amount of material fed, subtract this amount from the target weight and compare the difference to the amount of material calculated as equivalent to the feed alone time. When the difference is equal to the material equivalent amount, the logic associated with the decision threshold may be executed.

When using the method of the invention, the primary material may begin to feed at any time prior to the decision threshold. Secondary materials may begin to feed as, or after the primary material begins to feed. The system monitors the amount of the total material fed into the vessel. The system also monitors the amount of material fed from any actively feeding secondary material supply systems. It is possible to calculate the amount of the primary material which has been fed by subtracting the amount of secondary material provided from the total amount received in the vessel. After the amount of the primary material fed has been determined, the system may further determine the actual flow rate of the primary material using the time interval associated with the feeding of the material.

Prior to the decision threshold, any number of secondary materials may be added to the vessel. Multiple individual secondary sources may be used to provide respective secondary materials. A single secondary source may be used to provide multiple doses of a single secondary material. As a non-limiting example, a material may be pre-weighed and then supplied to the vessel. Multiple pre-weighed amounts may be prepared and added prior to the decision threshold.

The logic associated with reaching the decision threshold may hold or temporarily cease feeding the primary material or the secondary materials. At the time of the decision threshold, the system may determine the status of each material supply system. Each supply system may be determined to be actively feeding material or not feeding.

In one embodiment wherein each of the primary and secondary feed systems are actively feeding material at the time of the decision threshold, the system may hold the feeding of the primary material at and after the decision threshold. The primary material feed may continue to be held until any actively feeding secondary material supply systems finish feeding the necessary amount of the respective secondary materials. After the decision threshold and as the primary material feed is being held, additional secondary material feeds may begin continue until the desired quantity of the additional material has been fed. After all active secondary material feeds have finished feeding; the primary material feed may resume feeding. After feeding is resumed, the primary material feed will continue until the target weight of the primary material has been completely supplied.

In one embodiment wherein each of the primary and secondary feed systems are actively feeding material at the time of the decision threshold, the system may hold the feeding of the secondary material at and after the decision threshold. The system may continue feeding the primary material until the logic indicates that the target weight for the material has been fed. This may include feeding the primary material through the feed alone time established for the material. After the target weight has been indicated as being fed the system may resume feeding any secondary materials until the desired amounts of such materials have been fed.

The control of the primary material feed may take into consideration the spill of the primary feed. Spill is defined as the difference between the final weight and the scale reading at cutoff and is the discrepancy between the measured weight reading at the point the material feed stops and the final weight of the material in the mix tank after the process "settles". The following four components (a-d) contribute to the instantaneous spill, or the discrepancy between the measuring instrument reading at any given moment when a stop feed command is issued and the final measuring instrument reading which would result if the feed was completely stopped and the measuring instrument reading is stabled after the valve or pump or other final control element was given a command and finished its execution fully:

a. Material in Suspension—a portion of the material which has passed through the valve can still be in "free-fall" and has not yet reached the mix.

b. Deceleration Force—Force is required to stop the material which is falling into the mix. This dynamic force adds to the scale reading until the material flow has stopped.

c. Scale/Filter Lag—During feed, the scale reading at any moment can "lag" the actual weight on the scale when filtering is applied to dampen vibration due to agitators or other process components. Regardless of the type of filtering—mechanical, electronic or digital—the scale weight discrepancy, or lag, will increase as the feed flow rate increases. Greater filtering to increase smoothing also increases the lag.

d. Valve "Let-through"—Valves cannot be closed instantaneously. Some material passes through the valve while it is closing.

Spills apply for almost any kind of material transfer systems. Among four components, "a" and "b" apply for a scale or level type of measurement in terms of spill. The others apply for other kinds such as flowmeter, as well.

As the primary material is feeding during the feed alone time, a predicted value for the spill may be incorporated into the control logic to minimize the actual spill associated with the material feed.

In one embodiment a model may be used to calculate a predicted spill (PS): $PS=K_1*Q+K_2*Q^2$, wherein Q is the measured or calculated flow rate of the material and $K_1$, $K_2$ are parameters of the predictive model which are independent of material flow rate Q.

Referring to the aforementioned predictive model of $PS=K_1*Q+K_2*Q^2$, when the initial downward velocity of the material being fed is either equal to zero or independent of flow rate, then the following values are used:

$$K_1=\hat{O}_f+K_V-v_0/32.2$$

$$K_2=0$$

where, $\hat{O}_f$ is a filter composite time constant, $K_V$ is a valve let-through factor equal to $\int_0^{t_c} f[x_v(t)]\,dt$, and $v_0$ is the initial downward velocity of the material When the initial downward velocity of the material is proportional to flow rate, then the following values are used:

$$K_1 = \hat{O}_f + K_V,$$

$\hat{O}_f$ is a filter composite time constant,
$K_V$ is a valve let-through factor equal to $\int_0^{t'_c} f[x_v(t)] \, dt$, and $$K_2 = -1/(32.2 * \rho * A_V),$$

$\rho$ is a density of the material, and $A_V$ is a cross-sectional area of a valve or other conduit through which the material moves from the source location to the target location.

In one embodiment the PS may be used to determine the cutoff point for the primary material feeding during the feed alone time period. The formula PFW=W+PS, where predicted final weight (PFW) equals measured weight (W) plus the predicted spill. Feeding will continue until the relationship is satisfied.

In one embodiment the calculation of PS may be more sophisticated. In this embodiment, the range of flow rates of the material may be divided into a set of sub ranges comprising the whole range of possible flow rates; each sub range defined by a minimum and maximum flow rate. A model of the predicted spill may be provided for each sub range to provide a more accurate calculation of the predicted spill. The respective sub range models may be similar to the model described above with different coefficients for each sub range. The control system may calculate a flow rate for the material by dividing the weight increase sensed for the mix tank by the time associated with the weight increase. The calculated flow rate may be used to determine which sub range predictive spill model should be used to predict the spill. The calculated predicted spill may then be used in the calculation to determine the cutoff of the primary material feed.

The above described method for calculating PS and for the use of PS in controlling material feeding systems may be used in systems comprising a single material feed or systems comprising multiple material feeds. Use of this method in material feed control systems may provide a more precise material transfer and may reduce material waste.

After the primary material has resumed feeding and has subsequently fed the target weight and ceased feeding as determined and controlled by the feed control logic, additional secondary materials may be transferred to the mixing vessel.

The method of the invention may be used as part of a larger control system. Such a larger system may comprise a recipe management system. As either part of such a system, or as a stand-alone control system, the material transfer method may include a step of totaling the amount of material to be provided from all material supplies and verifying that the mixing vessel possesses sufficient capacity to receive all of the designated material. Upon this verification the transfer of material may proceed. Lacking the verification the transfer may be halted and a relevant message may be provided to a system attendant clarifying the reason for the stoppage.

EXAMPLES

Example 1

In one prophetic embodiment of the method, a material supply system would begin feeding a target weight of 10,000 lbs. of a primary material into a mixing tank. A historic feed rate for this material in this supply system would be provided as 10.0 lbs. per second. The feed alone time would be set at 10 seconds. As the primary material feeds, an instantaneous calculation of the feed rate using the control system clock and a filtered reading from the load cells of the mixing tank, will indicate that the rate is 10.0 lbs. per second.

As the primary material continues to feed, the difference between the target weight and the weight added to the mixing tank will be determined and divided by the instantaneous flow rate of the primary material. The quotient will be compared to the pre-set feed alone time.

Prior to the quotient being equal to the feed alone time, a secondary material provided from a pre-weighed material supply tank will begin feeding into the mixing tank. The measured weight lost from the pre-weighed tank will be subtracted from the measured weight gained by the mixing tank. The result will be used as the weight added to the mixing tank in the calculated comparison to the feed alone time as described above.

The primary feed will be held, or temporarily ceased, when the quotient equals the feed alone time. This will occur when the calculated weight gain of the mixing tank attributed to the primary material equal 9900 lbs. The difference between the added weight and the target weight (1000 lbs.) divided by the actual feed rate (10 lbs/sec) will equal the feed alone time of 10 seconds. The secondary material will continue to feed until the control logic indicates that the required amount of the secondary material has been fed.

The total amount of the secondary material sensed as removed by the secondary material pre-weigh sensor will be subtracted from the total material sensed as added to the mixing tank. The difference will be used in the calculations to determine the amount of the primary material necessary to reach the target weight of the primary material.

After the secondary material ceases to feed, the primary material will resume feeding and continue to feed until the target weight has been fed into the mixing tank as determined by the readings from the load cells of the mixing tank in conjunction with the control logic and any calculated Predicted Spill. Once the target weight has been fed, the primary material will cease to feed.

Example 2

In one prophetic embodiment of the method, a material supply system would begin feeding a target weight of 10,000 lbs. of a primary material into a mixing tank. A historic feed rate for this material in this supply system would be provided as 10.0 lbs. per second. The feed alone time would be set at 10 seconds. As the primary material feeds, an instantaneous calculation of the feed rate using the control system clock and a filtered reading from the load cells of the mixing tank, will indicate that the rate is 10.0 lbs. per second.

As the primary material continues to feed, the difference between the target weight and the weight added to the mixing tank will be determined and divided by the instantaneous flow rate of the primary material. The quotient will be compared to the pre-set feed alone time.

Prior to the quotient being equal to the feed alone time, a secondary material provided from a pre-weighed material supply tank will begin feeding into the mixing tank. The measured weight lost from the pre-weighed tank will be subtracted from the measured weight gained by the mixing tank. The result will be used as the weight added to the mixing tank in the calculated comparison to the feed alone time as described above.

The primary feed will be held, or temporarily ceased, when the quotient equals the feed alone time. This will occur when the calculated weight gain of the mixing tank attributed to the primary material equal 9900 lbs. The difference between the added weight and the target weight (1000 lbs.) divided by the actual feed rate (10 lbs/sec) will equal the feed alone time of 10 seconds. The secondary material will continue to feed until the control logic indicates that the required amount of the secondary material has been fed. A third material will begin to feed after the primary material has been held and before the secondary material finishes feeding. The tertiary material will feed from a system monitored using a mass flow meter. The output from the mass flow meter will be used to determine how much of the tertiary material has been fed to the mixing tank. The tertiary material will continue to feed until the required amount of the material specified by the batch recipe has passed through the mass flow meter.

The total amount of the secondary material sensed as removed by the secondary material pre-weigh sensor, and the amount of the tertiary material indicated as having passed through the mass flow meter will be subtracted from the total material sensed as added to the mixing tank. The difference will be used in the calculations to determine the amount of the primary material necessary to reach the target weight of the primary material.

After the secondary and tertiary materials cease feeding, the primary material will resume feeding and continue to feed until the target weight has been fed into the mixing tank as determined by the readings from the load cells of the mixing tank in conjunction with the control logic and any calculated Predicted Spill. Once the target weight has been fed, the primary material will cease to feed.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm." Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for controlling an amount of material transferred in a system having a plurality of material feeds and concurrent material transfer periods, the method comprising steps of:
   a. providing a receiving vessel coupled to a load sensing element,
   b. providing a primary material supply to the receiving vessel,
   c. providing a Target Weight (TW) amount for a primary material,
   d. providing a secondary material supply comprising a secondary material feed sensing element,
   e. determining a feed alone time period for the primary material, the feed alone time period beginning at a feed alone time threshold
   f. beginning to feed the primary material to the receiving vessel via the primary material supply,
   g. determining the actual feed rate of the primary material,
   h. starting to feed the secondary material into the receiving vessel as or after the primary material begins feeding into the receiving vessel, and before the feed alone time threshold,
   i. determining a feed status of the primary and secondary material feeds at the feed alone time threshold,
   j. ceasing to feed the primary material when the secondary material has an active feed status at the feed alone time threshold,
   k. resuming to feed the primary material as or after the secondary material feeding stops, and
   l. feeding only the primary material within the feed alone time period until the TW amount is fed.

2. The method according to claim 1 further comprising the step of verifying that the receiving vessel has sufficient capacity to hold the primary and secondary materials prior to initiating the feeding of the primary material.

3. The method according to claim 1 wherein the step of providing a secondary material supply comprising a secondary material feed sensing element comprises providing a material flow sensing element.

4. The method according to claim 1 wherein the step of providing a secondary material supply comprising a secondary material feed sensing element comprises providing a material weight sensing element.

5. The method according to claim 1 further comprising the steps of:
   p. providing a tertiary material supply comprising a tertiary material feed sensing element,
   q. starting to feed the tertiary material into the receiving vessel as or after the primary material begins feeding into the receiving vessel, and before the feed alone time threshold,
   r. determining a feed status of the tertiary material feed at the feed alone time threshold,
   s. ceasing to feed the primary material when the tertiary material has an active feed status at the feed alone time threshold,
   t. resuming to feed the primary material as or after the secondary and tertiary material feeding stops or completes, and
   u. feeding only the primary material within the feed alone time period until the TW amount is fed.

6. The method according to claim 1 further comprising steps of:
   m. feeding a first pre-weighed portion of the secondary material as or after the primary material begins feeding into the receiving vessel, and before the feed alone time threshold,
   n. pre-weighing a second portion of the secondary material during the concurrent feeding period,
   o. feeding the pre-weighed second portion of the second material after the first portion of the secondary material is fed into the receiving vessel, and before the feed alone time threshold.

7. The method according to claim 1 further comprising the step of:
   p. initiating the feeding of a secondary material into the receiving vessel after the TW of the primary material has been fed into the receiving vessel.

8. The method according to claim 1 further comprising the step of:
   p. determining a material feed cutoff point using a predicted spill for the material.
9. The method according to claim 1 further comprising the steps of:
   p. providing a tertiary material supply comprising a tertiary material feed sensing element,
   q. starting to feed the tertiary material into the receiving vessel before, at, or after the feed alone time threshold and before feeding the primary material resumes,
   r. resuming to feed the primary material as or after the secondary and tertiary material feeding has stopped or completed, and
   s. feeding only the primary material within the feed alone time period until the TW amount is fed.
10. The method according to claim 1 further comprising the steps of:
   m. defining a plurality of flow regions for at least one of the primary and secondary material feeds, each flow region defined by a minimum flow rate and a maximum flow rate,
   n. providing a distinct flow rate dependent spill prediction model for at least one of the plurality of regions,
   o. predicting a spill amount for the material feed according to the actual flow rate using the spill prediction model,
   p. adjusting a feed cutoff time for the material feed according to a target material feed amount and the predicted spill.
11. A method for controlling an amount of material transferred in a system having a plurality of material feeds and concurrent material transfer periods, the method comprising steps of:
   a. providing a receiving vessel coupled to a load sensing element,
   b. providing a primary material supply to the receiving vessel,
   c. providing a Target Weight (TW) amount for a primary material,
   d. providing a secondary material supply comprising a secondary material feed sensing element,
   e. determining a feed alone time threshold for the primary material,
   f. beginning to feed the primary material to the receiving vessel via the primary material supply,
   g. determining the actual feed rate of the primary material,
   h. starting to feed the secondary material into the receiving vessel as or after the primary material begins feeding into the receiving vessel,
   i. determining a feed status of the primary and secondary material feeds at the feed alone time threshold,
   j. ceasing to feed the secondary material when the primary material has an active feed status at the feed alone time threshold,
   k. feeding only the primary material after the feed alone time threshold until the TW amount is fed, and
   l. resuming to feed the secondary material as or after the primary material has completed feeding.
12. The method according to claim 11 further comprising the step of verifying that the receiving vessel has sufficient capacity to hold the primary and secondary materials prior to initiating the feeding of the primary material.
13. The method according to claim 11 wherein the step of providing a secondary material supply comprising a secondary material feed sensing element comprises providing a material flow sensing element.
14. The method according to claim 11 wherein the step of providing a secondary material supply comprising a secondary material feed sensing element comprises providing a material weight sensing element.
15. The method according to claim 11 further comprising the steps of:
   v. providing a tertiary material supply comprising a tertiary material feed sensing element,
   w. starting to feed the tertiary material into the receiving vessel as or after the primary material begins feeding into the receiving vessel, and before the feed alone time threshold,
   x. determining a feed status of the tertiary material feed at the feed alone time threshold,
   y. ceasing to feed the tertiary material when the primary material has an active feed status at the feed alone time threshold,
   z. feeding only the primary material after the feed alone time threshold until the TW amount is fed, and
   aa. resuming to feed the tertiary material as or after the primary material feeding is completed.
16. The method according to claim 11 further comprising steps of:
   q. feeding a first pre-weighed portion of the secondary material as or after the primary material begins feeding into the receiving vessel, and before the feed alone time threshold,
   r. pre-weighing a second portion of the secondary material during the concurrent feeding period,
   s. feeding the pre-weighed second portion of the second material after the first portion of the secondary material is fed into the receiving vessel, and before the feed alone time threshold.
17. The method according to claim 11 further comprising the step of:
   t. initiating the feeding of a secondary material into the receiving vessel after the TW of the primary material has been fed into the receiving vessel.
18. The method according to claim 11 further comprising the steps of:
   t. providing a tertiary material supply comprising a tertiary material feed sensing element,
   u. starting to feed the tertiary material into the receiving vessel at or after the feed alone time threshold and before feeding the primary material resumes,
   v. resuming to feed the primary material as or after the secondary and tertiary material feeding has stopped or completed, and
   w. feeding only the primary material within the feed alone time period until the TW amount is fed.
19. The method according to claim 11 further comprising the step of:
   p. determining a material feed cutoff point using a predicted spill for the material.
20. The method according to claim 11 further comprising the steps of:
   m. defining a plurality of flow regions for at least one of the primary and secondary material feeds, each flow region defined by a minimum flow rate and a maximum flow rate,
   n. providing a distinct flow rate dependent spill prediction model for at least one of the plurality of regions,
   o. predicting a spill amount for the material feed according to the actual flow rate using the spill prediction model, adjusting a feed cutoff time for the material feed according to a target material feed amount and the predicted spill.

* * * * *